US009842183B1

(12) United States Patent
Ginetti et al.

(10) Patent No.: US 9,842,183 B1
(45) Date of Patent: Dec. 12, 2017

(54) METHODS AND SYSTEMS FOR ENABLING CONCURRENT EDITING OF ELECTRONIC CIRCUIT LAYOUTS

(71) Applicant: CADENCE DESIGN SYSTEMS, INC., San Jose, CA (US)

(72) Inventors: Arnold Ginetti, Antibes (FR); Gerard Tarroux, Villeneuve-Loubet (FR); Jean-Noel Pic, Valbonne (FR); Olivier Arnaud, Peymeinade (FR); Devendra Deshpande, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 106 days.

(21) Appl. No.: 14/869,505

(22) Filed: Sep. 29, 2015

(51) Int. Cl.
*G06F 17/50* (2006.01)
*G06F 17/24* (2006.01)
*G06F 3/0481* (2013.01)
*G06F 17/30* (2006.01)
*G06F 3/0484* (2013.01)
*G06F 7/00* (2006.01)

(52) U.S. Cl.
CPC ...... *G06F 17/5072* (2013.01); *G06F 17/5022* (2013.01); *G06F 3/0481* (2013.01); *G06F 3/04842* (2013.01); *G06F 7/00* (2013.01); *G06F 17/24* (2013.01); *G06F 17/30312* (2013.01); *G06F 17/30979* (2013.01)

(58) Field of Classification Search
CPC .. G06F 17/5072; G06F 17/5022; G06F 17/24; G06F 7/00; G06F 17/30979; G06F 17/30312; G06F 3/0481; G06F 3/04842
See application file for complete search history.

(56) References Cited

U.S. PATENT DOCUMENTS

| | | | | |
|---|---|---|---|---|
| 6,742,165 | B2 * | 5/2004 | Lev | G06F 17/5045 716/102 |
| 6,862,220 | B2 * | 3/2005 | Kawahara | H01L 21/28273 257/E21.209 |
| 7,000,220 | B1 * | 2/2006 | Booth | G06F 8/71 717/103 |
| 7,143,341 | B1 | 11/2006 | Kohli | |
| 7,546,571 | B2 * | 6/2009 | Mankin | G06F 17/5045 700/103 |
| 7,590,963 | B2 | 9/2009 | Petunin | |
| 7,603,636 | B2 * | 10/2009 | Yamada | G06F 17/5022 716/103 |
| 8,209,605 | B2 * | 6/2012 | Poston | G06F 17/30716 715/273 |
| 8,326,926 | B2 | 12/2012 | Sangem et al. | |

(Continued)

OTHER PUBLICATIONS

U.S. Appl. No. 14/837,486, filed Aug. 27, 2015, Bernard et al.

(Continued)

*Primary Examiner* — Helen Rossoshek
(74) *Attorney, Agent, or Firm* — Eric L. Sophir; Dentons US LLP

(57) ABSTRACT

Methods and systems of an electronic circuit design system described herein provide a new layout editor tool to make edits in an electronic circuit layout. A plurality of partitions is created in the electronic circuit layout. The new layout editor tool enables multiple electronic circuit designers to edit a different partition of the plurality of partitions of the same electronic circuit layout at the same time and save the edited partition locally.

19 Claims, 9 Drawing Sheets

(56) References Cited

U.S. PATENT DOCUMENTS

| | | | | |
|---|---|---|---|---|
| 8,516,399 B2* | 8/2013 | Paris | .................... | G06F 17/5081 |
| | | | | 716/136 |
| 8,543,337 B2* | 9/2013 | Paxson | .................... | G06F 19/26 |
| | | | | 702/19 |
| 8,612,923 B2* | 12/2013 | Arora | ................. | G06F 3/04812 |
| | | | | 715/243 |
| 8,918,363 B2* | 12/2014 | Naidu | ............... | G06F 17/30575 |
| | | | | 707/610 |
| 8,966,425 B1* | 2/2015 | Eisenstadt | ........... | G06F 17/5077 |
| | | | | 716/120 |
| 9,171,119 B2* | 10/2015 | Aenuganti | .......... | G06F 17/5072 |
| 2002/0156757 A1* | 10/2002 | Brown | .................... | G06Q 10/06 |
| 2012/0120086 A1* | 5/2012 | Dang | ................. | G06F 17/30994 |
| | | | | 345/589 |
| 2013/0262974 A1* | 10/2013 | Anstis | ................. | G06F 17/246 |
| | | | | 715/217 |
| 2016/0034623 A1* | 2/2016 | Zhang | ................. | G06F 17/5063 |
| | | | | 716/102 |

OTHER PUBLICATIONS

U.S. Appl. No. 14/837,551, filed Aug. 27, 2015, Bernard et al.
U.S. Appl. No. 14/837,656, filed Aug. 27, 2015, Bernard et al.
U.S. Appl. No. 14/837,714, filed Aug. 27, 2015, Bernard et al.

* cited by examiner

METHODS AND SYSTEMS FOR ENABLING CONCURRENT EDITING OF ELECTRONIC CIRCUIT LAYOUTS

TECHNICAL FIELD

This application relates generally to the field of electronic circuits, and, more specifically, methods and systems for concurrent modification of the electronic circuit layouts.

BACKGROUND

A semiconductor circuit has a large number of components such as transistors, logic gates, and diodes that are fabricated by forming layers of different materials and of different geometric shapes on various regions of a silicon wafer. To fabricate either a printed circuit board or an integrated circuit, the semiconductor designer can use an Electronic Design Automation (EDA) tool to create a schematic design, such as a schematic semiconductor circuit layout. One advantage to an EDA tool is that it allows the designer to position and connect various shapes representing transistors or semiconductors on a circuit, even when there is a large number of components in the circuit. The semiconductor circuit layout typically contains data layers that correspond to the actual layers to be fabricated in the printed circuit board or the integrated circuit. Such semiconductor circuit layout designs usually have to adhere to a set of predefined criteria referred to as design rules which are unique to the product, product type, or manufacturing process. The design rule verification ensures that the semiconductor circuit layout has been properly executed and that the final semiconductor circuit layout created adheres to certain geometric design rules. Various techniques have been developed to ensure conformance to the semiconductor circuit layout design rules. The semiconductor circuit layout can also be created and edited manually by the semiconductor designer. The semiconductor circuit designer can create and edit the semiconductor circuit layout by means of a semiconductor circuit layout editor.

The semiconductor circuit layout created results in the representation of the semiconductor circuit in various semiconductor circuit layout data formats. These semiconductor circuit layout data formats involve a binary format for the representation of planar geometric shapes and text labels. Further, the semiconductor circuit layout editor involves final physical implementation of a semiconductor circuit design that is controlled through the semiconductor circuit designer modification.

A semiconductor circuit layout database forms a baseline of the semiconductor circuit design and stores semiconductor circuit layouts. When the semiconductor circuit designer wants to edit the semiconductor circuit layout by means of the semiconductor circuit layout editor, the semiconductor circuit designer first opens the semiconductor circuit layout database because the desired semiconductor circuit layout that has to be edited has been created earlier and saved into the semiconductor circuit layout database. The semiconductor designer will typically use a suitable software application that will enable the semiconductor circuit designer to open the desired semiconductor circuit layout, and once opened, the semiconductor circuit designer will be able to view a full layout of the selected semiconductor circuit layout. The semiconductor circuit designer then makes the edits using the semiconductor circuit layout editor, for example, add two more shapes or maybe deleting one or more shapes. After making the edits, the user then saves the edited semiconductor circuit layout back in the semiconductor circuit layout database.

The conventional semiconductor circuit layout database has a specification that does not allow several semiconductor circuit designers to update the semiconductor circuit layout at the same time. In order to control the stopping of multiple semiconductor circuit designers working on the same semiconductor circuit layout at the same time, the semiconductor circuit layout database is usually controlled by a suitable database management system. The database management system is basically a piece of software that does not allow the semiconductor circuit designers to edit the semiconductor circuit layout on the semiconductor circuit layout database unless the semiconductor circuit designer have the right to do it, and to get the right to edit it, the semiconductor circuit designer will first have to check out from the semiconductor circuit layout database. As soon as the semiconductor circuit designer check out the semiconductor circuit layout database, nobody else can check out the semiconductor circuit layout database at the same time. Other semiconductor circuit designers are able to view it, but nobody else can check it out at the same time. Thus, during the check out mode, only the allowed semiconductor circuit designer is able to update the semiconductor circuit layout, and once the semiconductor circuit designer is finished with the editing, the allowed semiconductor circuit designer check in and stores the modifications back in the semiconductor circuit layout database. At this point, other semiconductor circuit designers will be able to access and view the updated semiconductor circuit layout.

The conventional method of editing is not efficient in today's advanced node processes where there is a huge database of semiconductor circuit layouts, and it is desired that various semiconductor circuit designers work together on the this huge database having a collection of semiconductor circuit layouts. With the currently available system, each semiconductor circuit designer has to work one after the other, and there is no present capability to parallelize the tasks. This leads to wastage of both the resources and time. Therefore, there is a need in the art for methods and systems that addresses the above mentioned drawbacks of the conventional editing system employed for the semiconductor circuit layout designs.

SUMMARY

Methods and systems disclosed herein attempt to address the above issues and may provide a number of other benefits as well. Methods and systems of an electronic circuit design system described herein provide a new layout editor tool to make edits in an electronic circuit layout that solves the above mentioned drawbacks of the conventional editing tools being employed. The new layout editor tool enables multiple electronic circuit designers to edit a different partition of a same electronic circuit layout at the same time.

In one embodiment, a processor-implemented method for modifying an electronic circuit layout, where the method comprises generating, by a processor, a plurality of partitions in an electronic circuit layout of an electronic circuit, wherein each of the plurality of partitions contains at least a portion of the electronic circuit layout that is independent from the at least a portion of the electronic circuit layout in each respective partition; generating, by the processor, a delta view for each of the plurality of partitions, wherein the delta view is an cell view corresponding to a record in a cell database; in response to receiving one or more commands from one or more design layout interfaces assigned respectively to a partition of the plurality of partitions: modifying, by the processor, a respective delta view associated with the respective partition, according to a command received from a design layout interface assigned to the respective partition, thereby resulting in modified contents in the respective delta view; and updating, by the processor, each respective partition according to the modified contents for each of the plurality of partitions in the corresponding delta view.

In another embodiment, a system for modifying an electronic circuit layout, in which the system comprises a non-transitory machine-readable layout database storing an electronic circuit layout of an electronic circuit; a user interface for viewing representations of the electronic circuit layout on a display unit and receiving inputs by a plurality of electronic circuit designers; and a processor configured to generate a plurality of partitions in the electronic circuit layout, wherein each of the plurality of partitions depicting at least a portion of the electronic circuit layout which is different from a portion of the electronic circuit layout in others of the plurality of partitions; generate a delta view for each of the plurality of partitions; modify contents of the each of the plurality of partitions at a same time in response to a plurality of commands by the plurality of electronic circuit designers assigned to the plurality of partitions; and update modified contents for each of the plurality of partitions in their corresponding delta view.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
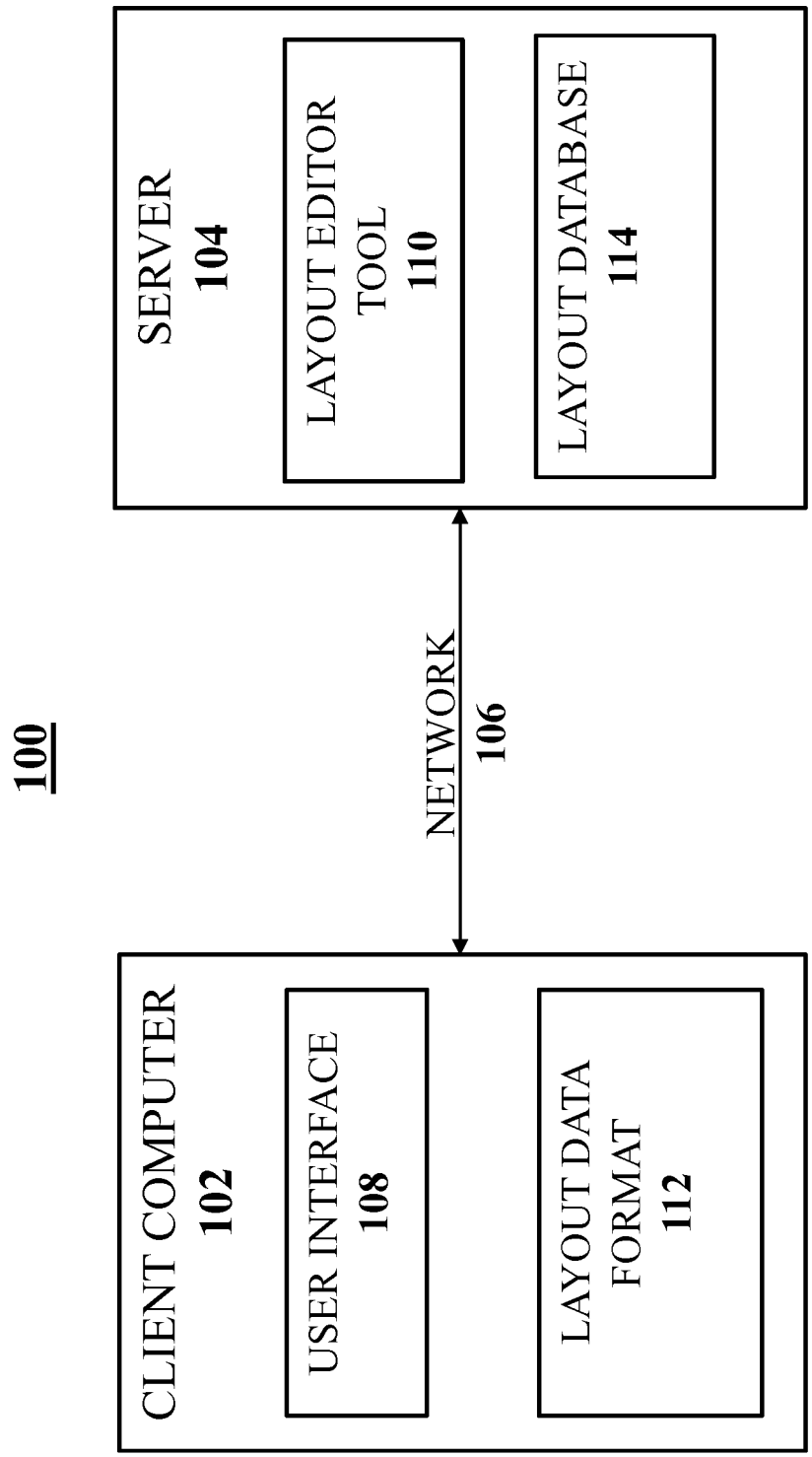
FIG. 1 illustrates various components for editing an electronic circuit layout, according to an exemplary embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The embodiments herein recite an improved method and system to enable concurrent editing of an electronic circuit layout. The electronic circuit layout represents an electronic circuit in terms of planar geometric shapes. The planar geometric shapes correspond to the shapes actually drawn on photo masks used in a semiconductor device fabrication. The electronic circuit layout is created by automatic Electronic Development Automation (EDA) tools. The electronic circuit layout can also be created and edited manually by an electronic circuit designer. The electronic circuit designer can create and edit the electronic circuit layout by means of an electronic circuit layout editor.

Various embodiments further describe an electronic circuit layout editor system that allows efficient electronic circuit layout data management. The electronic circuit layout editor system allows multiple electronic circuit designers to create partitions in an electronic circuit layout. The electronic circuit layout editor system allows multiple electronic circuit designers to edit a different partition of the same electronic circuit layout at the same time. The electronic circuit layout editor system allows multiple electronic circuit designers to locally save the edited version of the electronic circuit layout. The electronic circuit layout editor system allows multiple electronic circuit designers to locally check in/check out their edits in the electronic circuit layout. The electronic circuit layout editor system allows multiple electronic circuit designers to make their edits in the electronic circuit layout available to each other. The electronic circuit layout editor system allows an electronic circuit layout manager to merge the edits of the multiple electronic circuit designers in an original copy of the electronic circuit layout at the same time.

FIG. 1 illustrates various components for editing an electronic circuit layout 100, according to an exemplary embodiment. The components include a client 102 and a server 104. The client 102 may communicate with the server 104 via a network 106. The network 106 refers to a medium that also connects various computing devices. Examples of the network 106 include, but are not limited to, LAN, WLAN, MAN, WAN, and the Internet, as well as cloud-based computing networks and platforms. The communication over the network 106 may be performed in accordance with various communication protocols such as Transmission Control Protocol and Internet Protocol (TCP/IP), User Datagram Protocol (UDP), and IEEE communication protocols.

The client 102 may be any computing device accessed by an electronic circuit designer, and has a user interface 108. The computing device is a computer with a processor/microcontroller and/or any other electronic component that performs one or more operations according to one or more programming instructions. Examples of the computing device include, but are not limited to, a desktop computer, a laptop, a personal digital assistant (PDA), a tablet computer, or the like. The computing device is capable of communicating with the server 104 through the network 106 using wired or wireless communication capabilities. The client 102 has access to a layout database 114 in the server 104. The layout database 114 stores various electronic circuit layouts and pattern libraries. The client 102 also includes a collection of tools that are accessible using the user interface 108, and various electronic circuit layout data formats 112 including but not limited to a Graphic Database System ("GDS" or "GDSII") database format, a Manufacturing Electron Beam Exposure System (MEBES) database format, and an Open Artwork System Interchange Standard (OASIS) database format.

The server 104 is accessible to the client 102 via the network 106. The user interface 108 may receive instructions regarding an electronic circuit layout design from the electronic circuit designer stored in the layout database 114 of the server 104 to facilitate editing of the electronic circuit layout design. The server 104 includes a layout editor tool 110 that comprises a collection of tools. The layout editor tool 110 has access to the layout database 114. The electronic circuit designer of the client 102 uses the layout editor tool 110 to facilitate the editing of the electronic circuit design layout. The user may interact with the layout editor tool 110 through a number of input devices such as by inputting a selection as with a mouse or inputting a request as with a keyboard. The user may observe the response to the access request on an output device or display. The layout editor tool 110 may also run in an application window controlled by the user.

The layout database 114 generally provides a baseline to the electronic circuit layout design. Further, the electronic circuit layout design specifications of the electronic circuit for each of the formats such as the database format, the MEBES database format, and the OASIS database format, are compared with the baseline. Consequently, there is flow of information between the layout editor tool 110 and electronic circuit layout data viewer (not shown) which may result in a simultaneous display of the electronic circuit layout design in various electronic circuit layout data formats.

In another embodiment, the client 102 may execute a layout editor tool and may also access a layout database, which may reside on the client device or on a separate computing device coupled to the client 102. The client 102 may be any computing system comprising a processor that may be configured to execute the layout editor tool or otherwise facilitate access to the layout database storing layouts and pattern libraries. In yet another embodiment, multiple different clients 102 may access a server 104 hosting the layout database via the network 106 and request access to the electronic circuit layouts stored therein.

Figure 2:
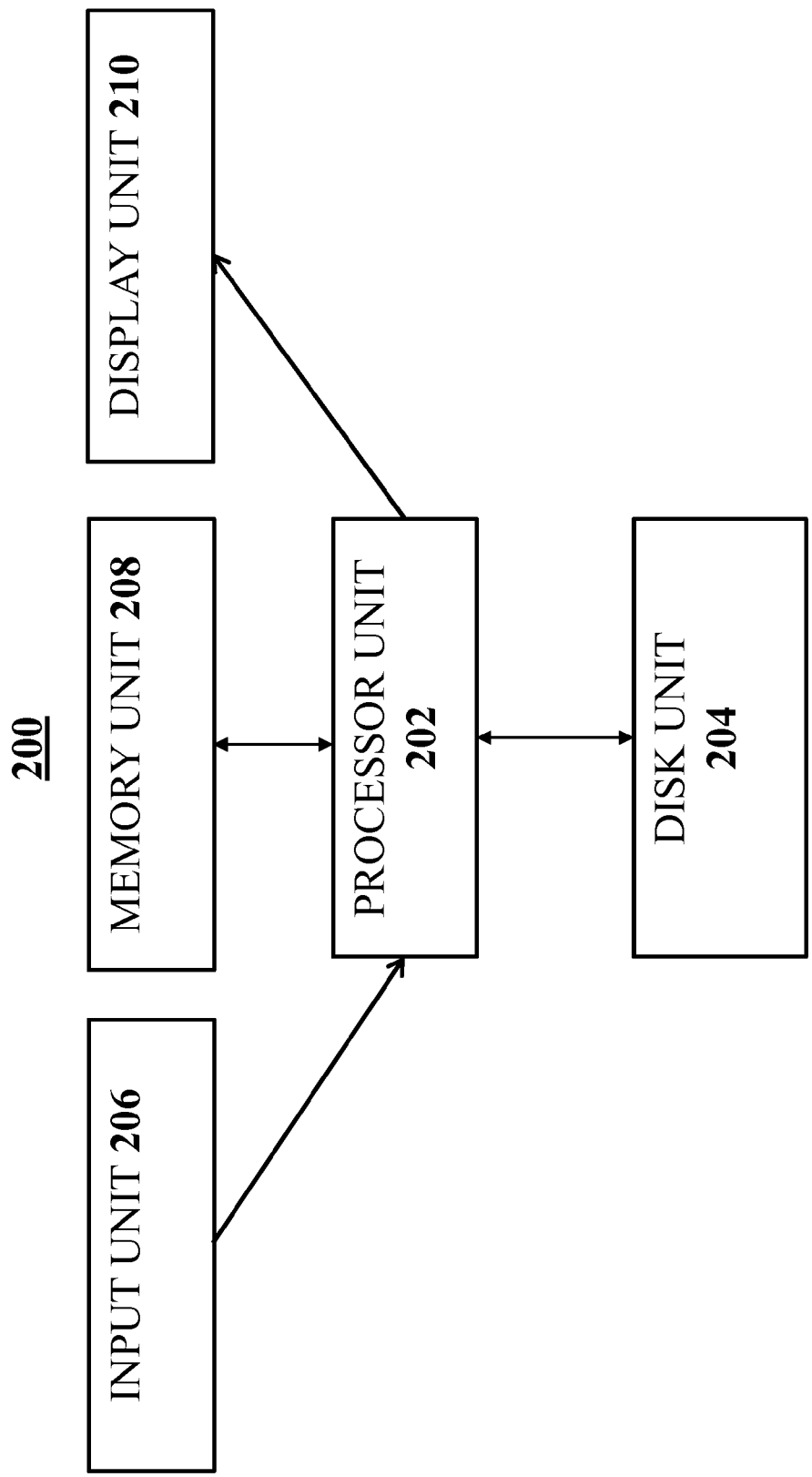
FIG. 2 is a block diagram depicting components of an electric circuit layout editing system, according to an exemplary embodiment.

FIG. 2 is a block diagram depicting components of an electric circuit layout editing system 200, according to an exemplary embodiment. The system 200 include a processor unit 202, a disk unit 204, an input unit 206, a memory unit 208, and a display unit 210. In one implementation, all the components of system 200 may be connected via interconnect bus. In another implementation, the processor unit 202 and the disk unit 206 may be connected via a local microprocessor bus, and the remaining units of the system 200 may be connected via one or more input/output buses.

The processor unit 202 implements a processor/microprocessor system to control the operations of the system 200. The processor unit 202 may include a single processor or a plurality of processor for configuring the system 200 as a multi-processor system. The processor includes suitable logic, circuitry, and interfaces that are operable to execute one or more instructions to perform predetermined operations/tasks. The processor can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

The disk unit 204 is a non-volatile storage device for storing electronic circuit layouts and instructions, to be used by the processor unit 202. The disk unit 204 is implemented with a magnetic disk drive, an optical disk drive, a solid state device, or an attachment to network storage. The disk unit 204 may comprise one or more memory devices to facilitate storage and manipulation of program code, set of instructions, tasks, data, PDKs, and the like. Some of the commonly known disk unit 204 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the disk unit 204 includes the one or more instructions that are executable by the processor(s) of the processor unit 202 to perform specific operations. It is apparent to a person having ordinary skills in the art that the one or more instructions stored in the disk unit 204 enable the processor of the system 200 to perform the predetermined operations/tasks. The support circuits for the processor include conventional cache, power supplies, clock circuits, data registers, I/O interfaces, and the like. The I/O interface may be directly coupled to the disk unit 204 or coupled through the processor of the processor unit 202.

The input unit 206 may be a keyboard, mouse, pointer, or other input generating device to facilitate input of control instructions by the integrated circuit designer to the processor unit 202. In one embodiment, the input unit 206 provides a portion of the user interface for the system 200, and may include an alphanumeric keypad for inputting alphanumeric and other key information along with a cursor control device such as a mouse, a track pad or stylus.

The memory unit 208 of the system 200 stores the software to load it to the disk unit 204. The memory unit 208 of the system 200 may also stores instructions to be used by processor unit 202 to allow the electronic circuit designer access to the electronic circuit layouts for viewing, editing, or maybe both. The display unit 210 of the system 200 may include a cathode ray tube (CRT) display, liquid crystal display (LCD), plasma, or active matrix organic light emitting diode display. In an embodiment, a graphics subsystem may receive textual and graphical information, and processes the information for output to the display unit 210. In one embodiment, the electronic circuit layouts may be accessed by the electronic circuit designer by way of a graphical user interface or layout editor visualized by the display unit 210. The display unit 210 may also visualize a graphical user interface or the layout editor having a design mode and an edit mode to enable generation an editing of custom electronic circuit designs.

Figure 3A:
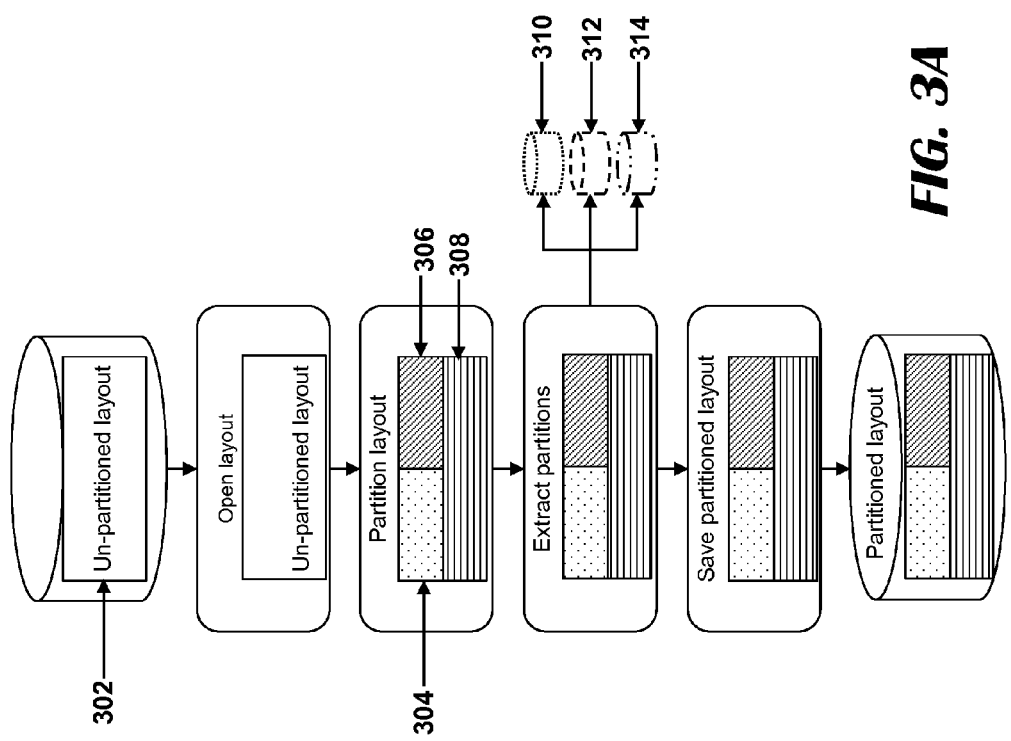
FIG. 3A illustrates partitioning of an electronic circuit layout, according to an exemplary embodiment.
Figure 3B:
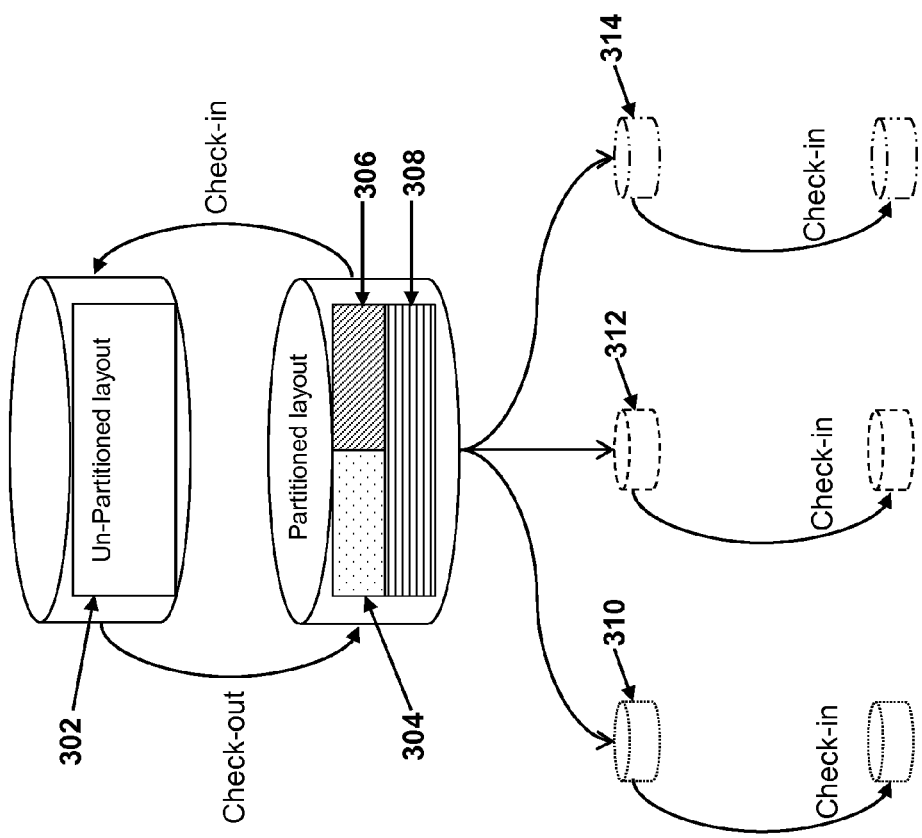
FIG. 3B illustrates partitioned electronic circuit layout, according to an exemplary embodiment.

FIG. 3A and FIG. 3B show execution of partitioning an electronic circuit layout, according to an exemplary embodiment. Initially, an electronic circuit layout 302 is created. The electronic circuit layout 302 created is un-partitioned. The electronic circuit layout 302 is a representation of an electronic circuit and its design in various electronic circuit layout data formats. In one example, the electronic circuit layout data formats may be, but are not limited to, a GDSII database format, a MEBES database format, and/or an OASIS database format. Such layout formats involve the binary format for the representation of planar geometric shapes. In one embodiment, the electronic circuit layout 302 is typically created through the use of an electronic circuit layout tool. The electronic circuit layout tool saves the electronic circuit layout in a particular file format. The different electronic circuit layout tools may use different formats. Although the embodiments disclosed herein may use any particular electronic circuit layout format, there may be advantages to having the electronic circuit layout features of the electronic circuit layout defined in an electronic circuit layout database format to enable efficient and relatively quick access to the electronic circuit layout features that are offered by a database management system of the electronic circuit layout database.

After the creation of the electronic circuit layout 302, the un-partitioned electronic circuit layout 302 is stored in a disk unit which may be an OpenAccess™ standard database, although any suitable database may be used depending on the EDA and/or PDK application accessing the database. One example of a common database type that can be employed to store and access data is GDSII data based upon the OpenAccess™ standard. OpenAccess™ is a standard for the electronic circuit designs that allows foundational interoperability for design data between different types of tools.

A layout editor tool is a tool that allows electronic circuit design managers/electronic circuit designers to view components of the electronic circuit layout 302 stored in the disk at various levels of precision and control. The layout editor tool also allows the electronic circuit design managers/electronic circuit designers to edit (or modify) components of the electronic circuit layout 302 stored in the disk at various levels of precision and control. In one embodiment, the layout editor tool operates to present some or all of the electronic circuit layout 302 to the electronic circuit design manager/electronic circuit designer where the displayable portion of the electronic circuit layout 302 is defined based upon some control or direction provided by the electronic circuit design manager/electronic circuit designer which allows the layout editor tool to identify the specific objects on the specific layers that need to be displayed. In one embodiment, the entire electronic circuit layout 302 is partitioned into smaller regions of variable or equal size that contains a collection of design figures using the layout editor tool.

In order to create the partitions in the electronic circuit layout 302, the electronic circuit design manager gives a command in the layout editor tool (or other design tools) to open the un-partitioned electronic circuit layout 302. In one embodiment, the electronic circuit design manager will then select and define portions in the un-partitioned electronic circuit layout 302 to be created as partitions and then invoke a command that will result in the processor completing the partitioning as per the selections made by the electronic circuit design manager. In another embodiment, a plurality of electronic circuit designers will make a selection of their desired working area in the electronic circuit layout 302 and provide to the electronic circuit layout manger. The electronic circuit layout manager will then directly invoke a command comprising instructions and selections made by the electronic circuit layout designers that will result in the processor completing the partitioning. The processor and the layout editor tool will then make the desired partitioning of the electronic circuit layout 302, and the portions of the partitions of the electronic circuit layout 302 are illustrated by 304, 306, 308. The composition of the portions 304, 306, 308 of the electronic circuit layout 302 may be collectively referred to as a partitioned electronic circuit layout. In the present disclosure, the electronic circuit layout 302 refers to un-partitioned layout whereas the partitioned layout is referred as partitioned electronic circuit layout.

The partitioned electronic circuit layout is then stored back into the disk. The electronic circuit design manager will assign each of the portions 304, 306, 308 of the electronic circuit layout to the plurality of electronic circuit designers for working on the portions 304, 306, 308 of the electronic circuit layout. In one embodiment, the electronic circuit design manager will assign a login name and a login password for each of the portions 304, 306, 308 of the electronic circuit layout, and provide the login name and the login password to the plurality of electronic circuit designers for getting access to operate on the portions 304, 306, 308 of the electronic circuit layout.

The electronic circuit design manager further gives a command in the layout editor tool (or other design tools) to create a corresponding delta view 310, 312, 314 for each of the partitions 304, 306, 308 of the electronic circuit layout. After invoking the command, the processor initiates the creation of the delta view. In one embodiment, the delta view is an OpenAccess™ cell view, and comprises information/data that enables the electronic circuit designers to detect that this is the delta view and not a regular layout view. In one example, the information/data is encrypted information. As illustrated and embodied in the FIG. 3a and FIG. 3b, the delta view 310, 312, and 314 for each of the partitions 304, 306, and 308 of the electronic circuit layout is empty at the time of their creation. The delta view 310, 312, and 314 for each of the partitions 304, 306, and 308 of the electronic circuit layout is also saved into the disk.

Figure 3C:
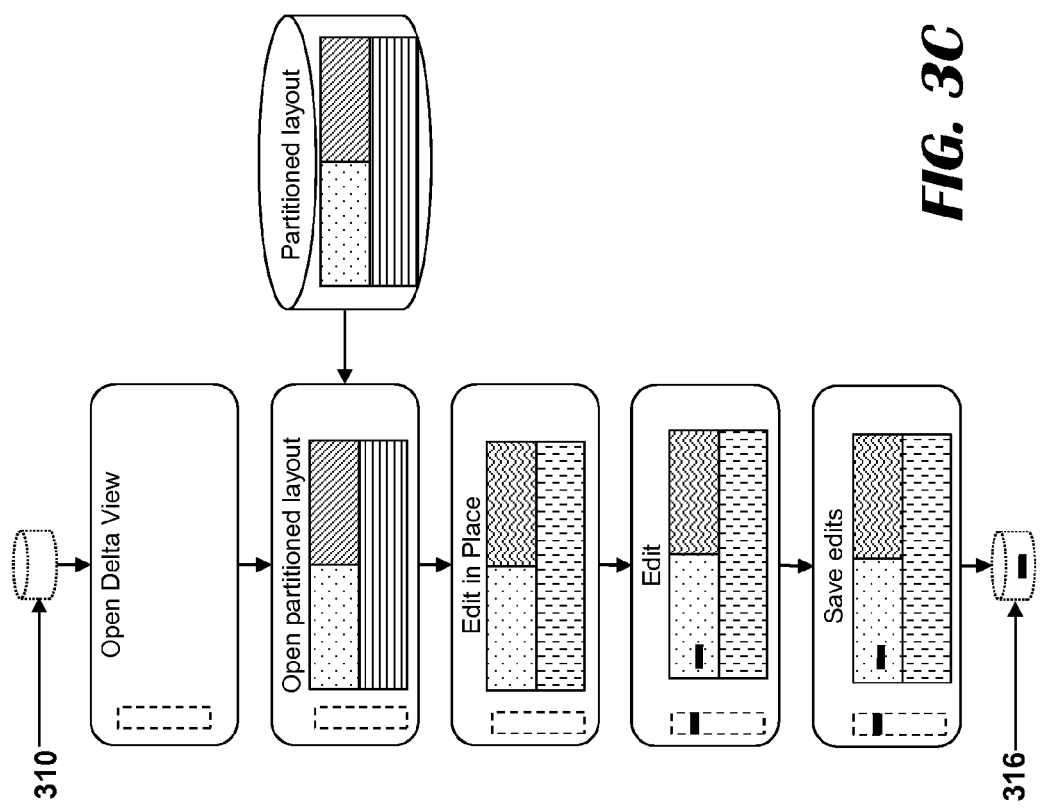
FIG. 3C illustrates concurrent editing of an electronic circuit layout, according to an exemplary embodiment.

FIG. 3C shows execution of concurrent editing of an electronic circuit layout, according to an exemplary embodiment. In one example, a first electronic circuit designer is assigned to the partition 304 of the electronic circuit layout. If the first electronic circuit designer want to make edits in the partition 304 of the electronic circuit layout, the first electronic circuit designer will initiate the opening of the delta view 310 that corresponds to its partition 304 of the electronic circuit layout. The delta view 310 that corresponds to its partition 304 of the electronic circuit layout will contain at least some portion of encrypted information that will ensure the first electronic circuit designer that the view opened is really the delta view 310 that corresponds to its partition 304 of the electronic circuit layout. In an embodiment, the delta view 310 will be opened in a write mode. After the opening of the write mode of the delta view 310, the partitioned electronic circuit layout is also opened automatically. The first electronic circuit designer will then initiate the editing of the partition 304 of the partitioned electronic circuit layout, and the edits will get registered in an edited version of the delta view 310 referred to as edited delta view 316. The first electronic circuit designer will save the edits after they are completed and the edits get saved in the edited delta view 316.

Figure 3D:
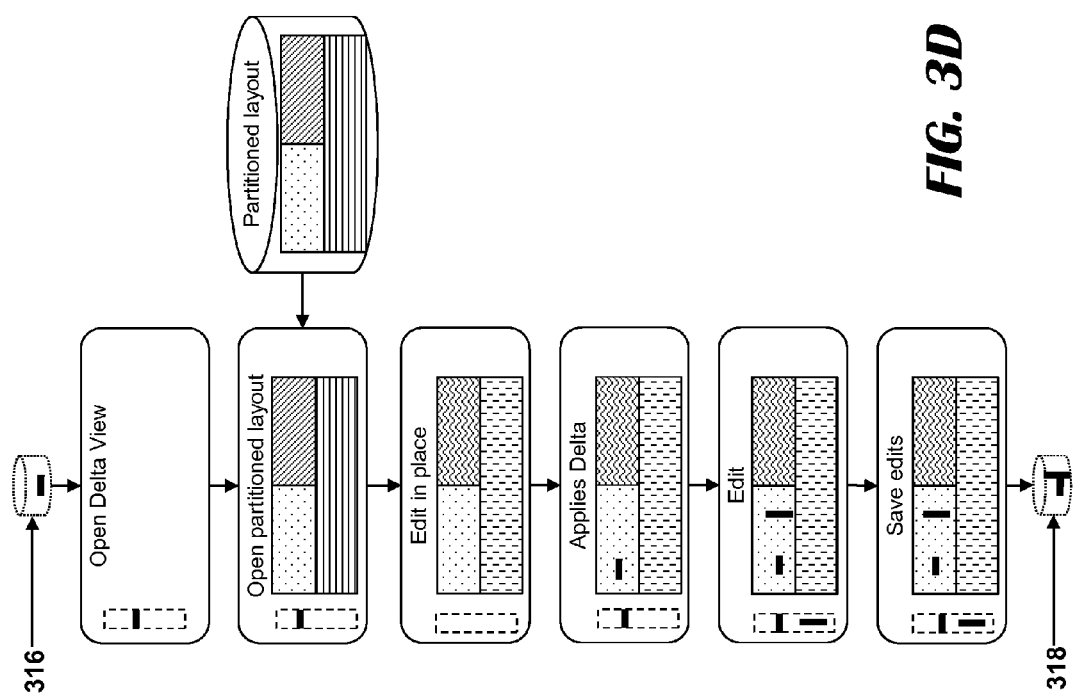
FIG. 3D illustrates concurrent editing of an electronic circuit layout, according to an exemplary embodiment.

FIG. 3D shows execution of concurrent editing of an electronic circuit layout, according to an exemplary embodiment. If the first electronic circuit designer want to make further edits in the partition 304 of the electronic circuit layout, the first electronic circuit designer will open the edited delta view 316 corresponding to the partition 304 of the electronic circuit layout. In an embodiment, the first electronic circuit designer will check the prior edits made to make sure the view opened is the edited delta view 316 corresponding to the partition 304 of the electronic circuit layout. The edited delta view 316 is opened in a write mode. After the opening of the write mode of the edited delta view 316, the partitioned electronic circuit layout will be opened automatically. The concurrent layout editor will apply the edit previously stored in the opened edited delta view 316 to the partitioned layout. The first electronic circuit designer will then edit the partition 304 of the partitioned electronic circuit layout, and the edits will get registered in an edited version of the edited delta view 316 refereed as new edited delta view 318. The first electronic circuit designer will save the edits after they are completed and the edits get saved in the new edited delta view 318.

Figure 3E:
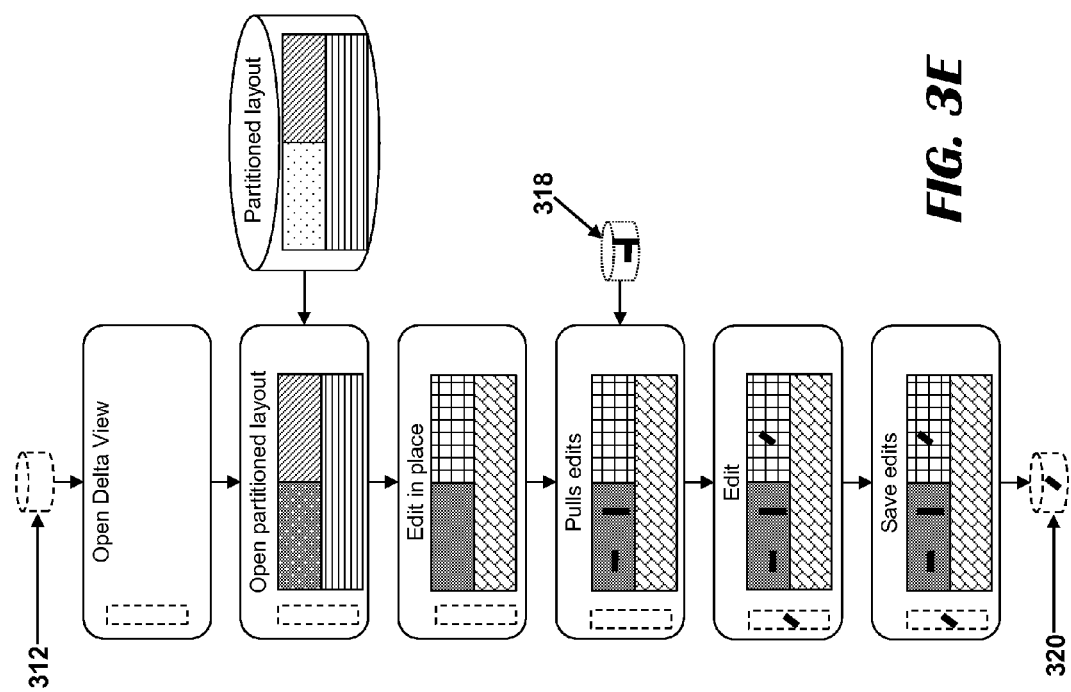
FIG. 3E illustrates concurrent editing of an electronic circuit layout, according to an exemplary embodiment.

FIG. 3E shows execution of concurrent editing of an electronic circuit layout, according to an exemplary embodiment. If another electronic circuit designer other than the first electronic circuit designer (for example, a second electronic circuit designer) want to make edits in the partition 306 of the electronic circuit layout, the second electronic circuit designer will open the delta view 312 that corresponds to the partition 306 of the electronic circuit layout. The delta view 312 that corresponds to its partition 306 of the electronic circuit layout will contain at least some portion of encrypted information that will ensure the second electronic circuit designer that the view opened is really the delta view 312 that corresponds to its partition 306 of the electronic circuit layout. In an embodiment, the delta view 312 is opened in a write mode. After the opening of the write mode of delta view 312, the partitioned electronic circuit layout is opened automatically. The second electronic circuit designer will initiate the edits in the partition 306 of the partitioned electronic circuit layout, and the edits will get registered in an edited version of the delta view 312 refereed as edited delta view 320. The second electronic circuit designer will save the edits after they are completed and the edits get saved in the edited delta view 320. In an embodiment, the second electronic circuit designer may also pull the edits in the new edited delta view 318 performed by the first electronic circuit designer.

Figure 3F:
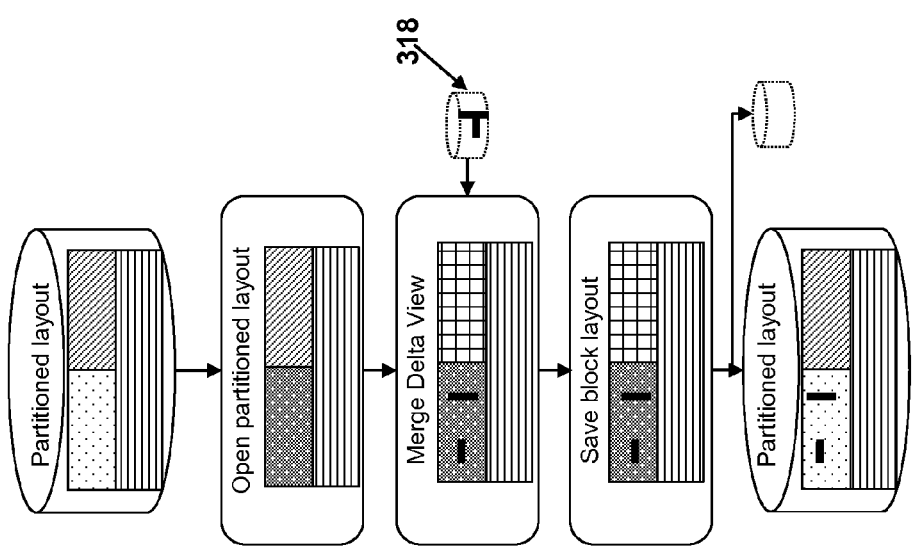
FIG. 3F illustrates merging of edited electronic circuit layout, according to an exemplary embodiment.

FIG. 3F shows execution of merging of edited electronic circuit layout, according to an exemplary embodiment. An electronic circuit design manager opens the partitioned electronic circuit layout and the new edited delta view 318. The partitioned electronic circuit layout is opened in a write mode. The electronic circuit design manager merges the new edited delta view 318 to the partitioned electronic circuit layout. The edits in the new edited delta view 318 are then saved into the partitioned electronic circuit layout, and the new edited delta view 318 is then reset to make it empty. The electronic circuit layout having the edits is now an original version which is saved to the disk.

Figure 4:
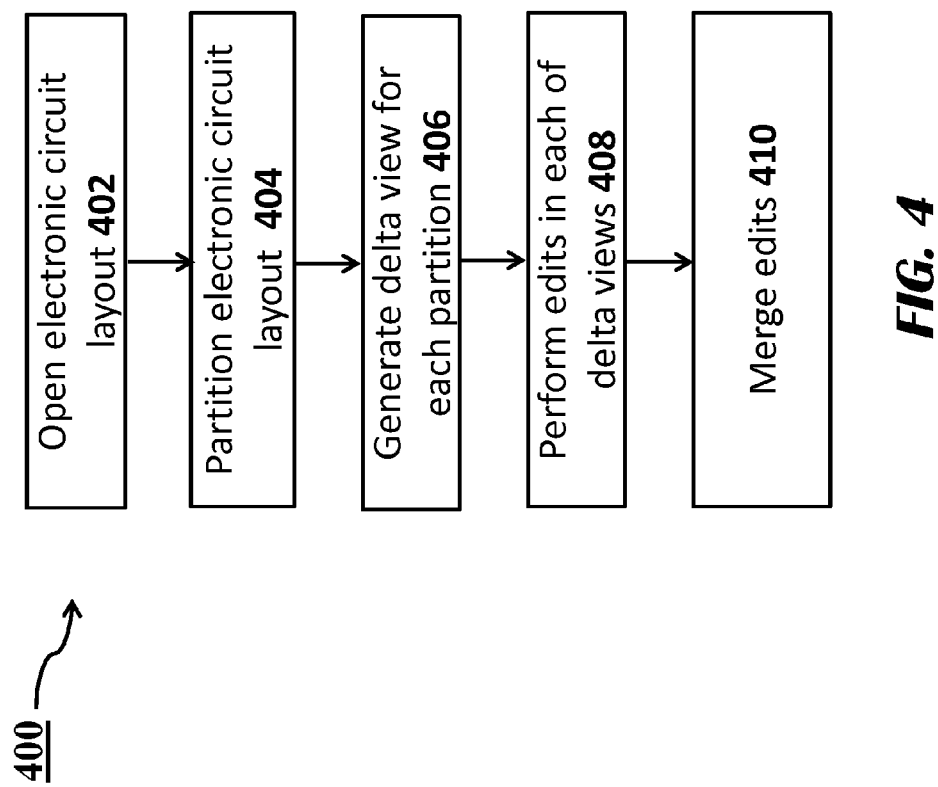
FIG. 4 is a flow diagram illustrating a method of editing of an electronic circuit layout, according to an exemplary embodiment.

FIG. 4 is a flow diagram showing execution of editing of an electronic circuit layout, according to an exemplary method embodiment. At step 402, the file for an electronic circuit layout is opened. In one embodiment, the electronic circuit layout characterizes an electronic circuit in planar geometric shapes. Further, the electronic circuit layout is a representation of the electronic circuit in various electronic circuit layout data formats. The electronic circuit layout data formats involve a binary format for the representation of planar geometric shapes and text labels. An electronic circuit design manager will open the electronic circuit layout on a suitable user interface using a suitable software application.

In one embodiment, the electronic circuit layout of the electronic circuit may be created by a processor of an Electronic Design Automation (EDA) system and stored in any suitable non-transitory machine-readable layout database (via a disk), such as OpenAccess™, where in one example, the electronic circuit layout data formats may be stored in a GDS database format. The electronic circuit designers design electronic circuit by transforming logical or circuit descriptions of the electronic circuit into geometric descriptions called layouts using the processor of any known EDA applications. The electronic circuit layouts may include geometric representations of electronic circuit elements that are to be fabricated on a wafer such as electronic circuit components, and may further include several geometries such as circuit modules, that is, the geometric representations of electronic or circuit components with pins, and interconnect lines, that is, geometric representations of wiring that connect the pins of the circuit modules on a same layer.

The processor and the computer-based tools of the EDA applications may also be used for partitioning, editing, and analyzing electronic circuit design layouts along with the creation of the electronic circuit layout.

At step 404, the electronic circuit layout is partitioned. A plurality of partitions is created by the processor in the electronic circuit layout of the electronic circuit. Each of the plurality of partitions created depicts at least a portion of the electronic circuit layout which is different from a portion of the electronic circuit layout in others of the plurality of partitions. The electronic circuit design manager will give a partition command to the processor to create the plurality of partitions in the electronic circuit layout of the electronic circuit. The partition command will include details relating to collection of figures to be included in each partition of the plurality of partitions of the electronic circuit layout. Further, a login name and a login password may be assigned to each of the plurality of partitions of the electronic circuit layout wherein the login name relates to each of plurality of electronic circuit designers assigned to operate on the plurality of partitions of the electronic design layout. Each of the plurality of electronic circuit designers upon entering the login name and the login address can access their corresponding plurality of partitions of the electronic circuit layout. It also should be appreciated that the partition command can allocate access to each of the plurality of partitions through any other measures and criteria selected by the electronic circuit designer and not be limited to the login name and password set up.

At step 406, a delta view corresponding to each partition is generated. The electronic circuit design manager gives a command to the processor to generate a delta view for each of the plurality of partitions. After invoking the command, the processor initiates the creation of the delta view. In one embodiment, the delta view is an OpenAccess™ cell view, and comprises information/data that enables the electronic circuit designers to detect that this is the delta view and not a regular layout view. In one example, the information/data is encrypted information. The delta view for each of the plurality of partitions of the electronic circuit layout is empty at the time of their creation. The delta view for each of the plurality of partitions of the electronic circuit layout is also saved into the non-transitory machine-readable OpenAccess™ layout database. It also should be appreciated that any other suitable cell view can be presented as the delta view of partitioned electronic circuit layout information/data that is distinctive and separate from the regular views of the layout tool, and the cell view and its underlying functionalities do not have to be through the OpenAccess standard such as an independent, custom system or custom extensions to OpenAccess.

At step 408, edits in each of the delta views is performed. In response to a plurality of commands by the plurality of electronic circuit designers associated to each of the plurality of partitions, the processor enables concurrent modification of contents of the each of the plurality of partitions at a same time. This allows each of the plurality of electronic circuit designers to simultaneously work and perform modification (or initiate modification) in their delta view associated with their corresponding partition of the plurality of partitions of the electronic circuit layout. After the modifications, the electronic circuit designers can update and save modified (edited) contents for each of the plurality of partitions in their corresponding delta view.

In an embodiment, the layout editor tool may be used for modifying the contents of the each of the plurality of partitions by the plurality of electronic circuit designers. The layout editor tool may be an analog layout tool or a digital tool. Using the layout editor tool, the plurality of electronic circuit designers may also send a request to the processor to modify the contents in the delta view corresponding to the plurality of partitions. After the modification is completed, the modified contents are locally saved in the delta view associated to each of the plurality of partitions in a non-volatile memory. The modified contents for each of the plurality of partitions in their corresponding delta view may be viewable by each of the plurality of electronic circuit designers and the electronic circuit design manager. In one embodiment, the electronic circuit designer for a given partition of the electronic circuit layout may have to provide access to other electronic circuit designers and electronic circuit manager to view the modified contents in the delta view for the given partition of the electronic circuit layout. In another embodiment, the electronic circuit designer for a given partition of the electronic circuit layout does not have to provide access to other electronic circuit designers and electronic circuit manager to view the modified contents in the delta view for the given partition of the electronic circuit layout as they are sent an automatic alert on modifications performed by the EDA system when the modified contents are stored.

At step 410, edits are merged. The electronic circuit design manager views the modified contents in the delta view associated to each of the plurality of partitions, and initiates a merge command to the processor for merging the modified contents in the delta view corresponding to each of the plurality of partitions in an original copy of the electronic circuit layout. In one embodiment, the electronic circuit design manager can accept all the modifications in the modified contents for each of the plurality of partitions in their corresponding delta view prior to the merging of the modified contents for each of the plurality of partitions in their corresponding delta view in the electronic circuit layout. In another embodiment, the electronic circuit design manager can decline all the modifications in the modified contents for each of the plurality of partitions in their corresponding delta view and does not merge the modified contents for each of the plurality of partitions in their corresponding delta view in the electronic circuit layout. In yet another embodiment, the electronic circuit design manager may accept some modifications and decline some modifications of the modified contents for each of the plurality of partitions in their corresponding delta view prior to the merging of the modified contents for each of the plurality of partitions in their corresponding delta view in the electronic circuit layout. Alternatively, based on particular criteria, settings, or design rules, the layout editor tool may determine which edits to accept or decline, in which the layout editor tool may take the action itself or present its recommendation to the electronic circuit design manager. A version of the original electronic circuit layout including the edits that are merged into it is stored in the non-transitory machine-readable OpenAccess™ layout database or in any other suitable database.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A processor-implemented method for modifying an electronic circuit layout, comprising:
    generating, by a processor, a plurality of partitions in an electronic circuit layout, wherein each of the plurality of partitions contains at least a portion of the electronic circuit layout that is independent from the portions of the electronic circuit layout in the other partitions of the plurality of partitions;
    generating, by the processor, an empty delta view for each of the plurality of partitions, wherein the empty delta view is a cell view corresponding to a record in a cell database, wherein the empty delta view is configured to be checked in and checked out locally;
    concurrently rendering, by the processor, one or more design layout interfaces each showing at least one partition of the plurality of partitions, wherein the at least one partition is configured to be edited using the respective design layout interface;
    while receiving one or more concurrent modification instructions to edit the respective partitions configured to be edited from the one or more design layout interfaces:
        modifying, by the processor, the respective empty delta view associated with the respective partition configured to be edited, according to the respective modification instructions received from the respective design layout interface to generate a respective modified delta view from the respective empty delta view, wherein the modified delta view is configured to checked in and checked out locally; and
        updating, by the processor, each respective partition according to the respective modified delta view, thereby allowing parallel editing of the electronic circuit layout by a plurality of electronic circuit designers.

2. The processor-implemented method of claim 1, further comprising merging, by the processor, contents in the respective modified delta view corresponding to each of the plurality of partitions in the electronic circuit layout.

3. The processor-implemented method of claim 1, further comprising creating, by the processor, the electronic circuit layout of the electronic circuit, wherein the electronic circuit layout characterizes the electronic circuit in relation to planar geometric shapes.

4. The processor-implemented method of claim 1, wherein the electronic circuit layout of the electronic circuit is stored in a non-transitory machine-readable layout database.

5. The processor-implemented method of claim 1, further comprising assigning, by the processor, a login name to each of the plurality of partitions, wherein the login name of a partition of the plurality of partitions corresponds to an assigned electronic circuit designer of the plurality of electronic circuit designers.

6. The processor-implemented method of claim 1, further comprising locally saving, by the processor, the delta view associated with each of the plurality of partitions with modified contents in a non-volatile memory.

7. The processor-implemented method of claim 1, further comprising receiving a request, by the processor, by each of the plurality of electronic circuit designers to modify the contents in each of the plurality of partitions.

8. The processor-implemented method of claim 1, wherein the processor executes a layout editor tool for modifying the contents of each of the plurality of partitions.

9. The processor-implemented method of claim 1, wherein the modified contents for each of the plurality of partitions in their corresponding delta view is viewable by each of the plurality of electronic circuit designers.

10. The processor-implemented method of claim 1, wherein the modified contents for each of the plurality of partitions in their corresponding delta view can either be accepted or declined prior to the merging of the modified contents for each of the plurality of partitions stored in their corresponding delta view in the electronic circuit layout.

11. A system for modifying an electronic circuit layout, comprising:
    a non-transitory machine-readable layout database storing an electronic circuit layout of an electronic circuit;
    one or more user interfaces for viewing representations of the electronic circuit layout on a display unit and receiving inputs by a plurality of electronic circuit designers; and
    a processor configured to:
        generate a plurality of partitions in the electronic circuit layout, wherein each of the plurality of partitions contains at least a portion of the electronic circuit layout which is independent from the portions of the electronic circuit layout in other partitions of the plurality of partitions;
        generate an empty delta view for each of the plurality of partitions, wherein the empty delta view is configured to be checked in and checked out locally;
        concurrently render in the one or more user interfaces at least one partition of the plurality of partitions, wherein the at least one partition is configured to be edited using the respective design layout interface;

while receiving one or more concurrent modification instructions to edit the respective partitions configured to be edited from the one or more user interfaces:

modify the respective empty delta view associated with the respective partition configured to be edited, according to the respective modification instructions received from the respective user interface to generate a corresponding modified delta view from the respective empty delta view, wherein the modified delta view is configured to be checked in and checked out locally; and update each of the plurality of partitions according to the corresponding modified delta view, thereby allowing parallel editing of the electronic circuit layout by a plurality of electronic circuit designers.

12. The system of claim 11, wherein the processor is further configured to merge contents in the respective modified delta view corresponding to each of the plurality of partitions in the electronic circuit layout.

13. The system of claim 11, wherein the processor is further configured to create the electronic circuit layout of the electronic circuit, wherein the electronic circuit layout characterizes the electronic circuit in relation to planar geometric shapes.

14. The system of claim 11, wherein the processor is further configured to assign a login name to each of the plurality of partitions, wherein the login name of a partition of the plurality of partitions corresponds to an assigned electronic circuit designer of the plurality of electronic circuit designers.

15. The system of claim 11, wherein the processor is further configured to locally save the delta view associated to each of the plurality of partitions with modified contents in a non-volatile memory.

16. The system of claim 11, wherein the processor is further configured to receive a request by each of the plurality of electronic designers to modify the contents in each of the plurality of partitions.

17. The system of claim 11, further comprising at least one computing device executing a layout editor tool for modifying the contents of each of the plurality of partitions.

18. The system of claim 11, wherein the modified contents for each of the plurality of partitions in their corresponding delta view is viewable by each of the plurality of electronic circuit designers.

19. The system of claim 11, wherein the modified contents for each of the plurality of partitions in their corresponding delta view can either be accepted or declined prior to the merging of the modified contents for each of the plurality of partitions in their corresponding delta view in the electronic circuit layout.

* * * * *